J. A. LIDBACK, DEC'D.
G. H. LIDBACK, ADMINISTRATOR.
SAUSAGE LINKING MACHINE.
APPLICATION FILED NOV. 3, 1913.
1,195,043.
Patented Aug. 15, 1916.
3 SHEETS—SHEET 2.
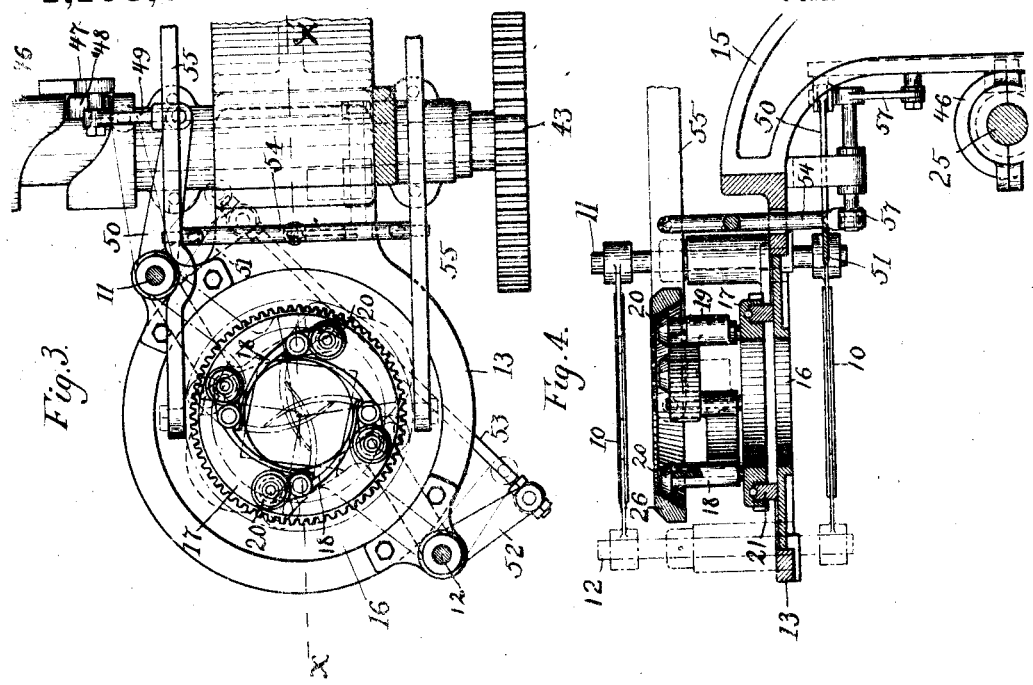
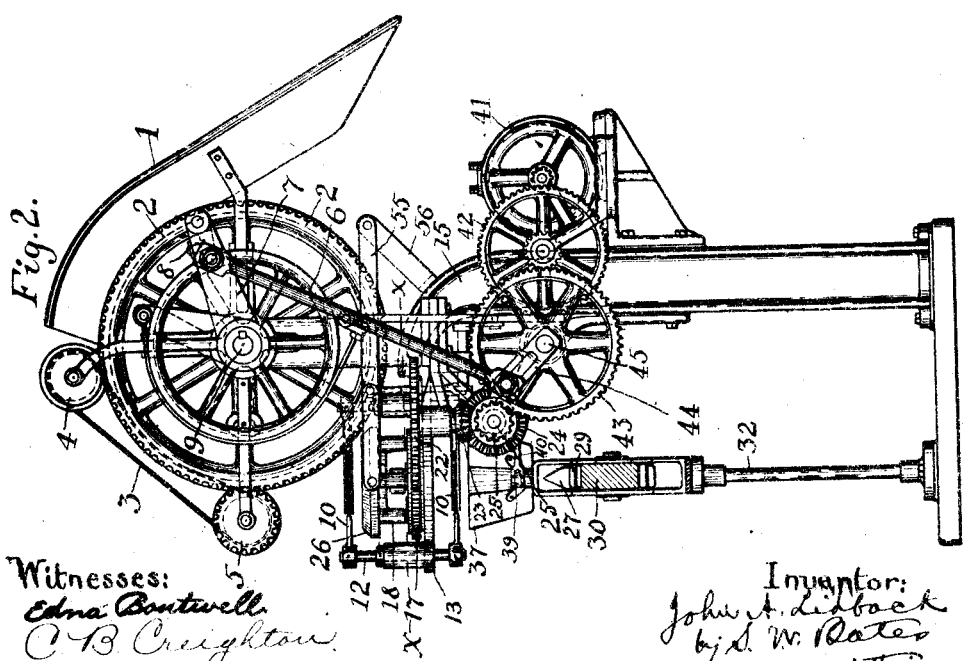
Witnesses:
Edna Boutwell
C. B. Creighton
Inventor:
John A. Lidback
by J. W. Bates
Atty J. A. LIDBACK, DEC'D.
G. H. LIDBACK, ADMINISTRATOR.
SAUSAGE LINKING MACHINE.
APPLICATION FILED NOV. 3, 1913.
1,195,043.
Patented Aug. 15, 1916.
3 SHEETS—SHEET 3.
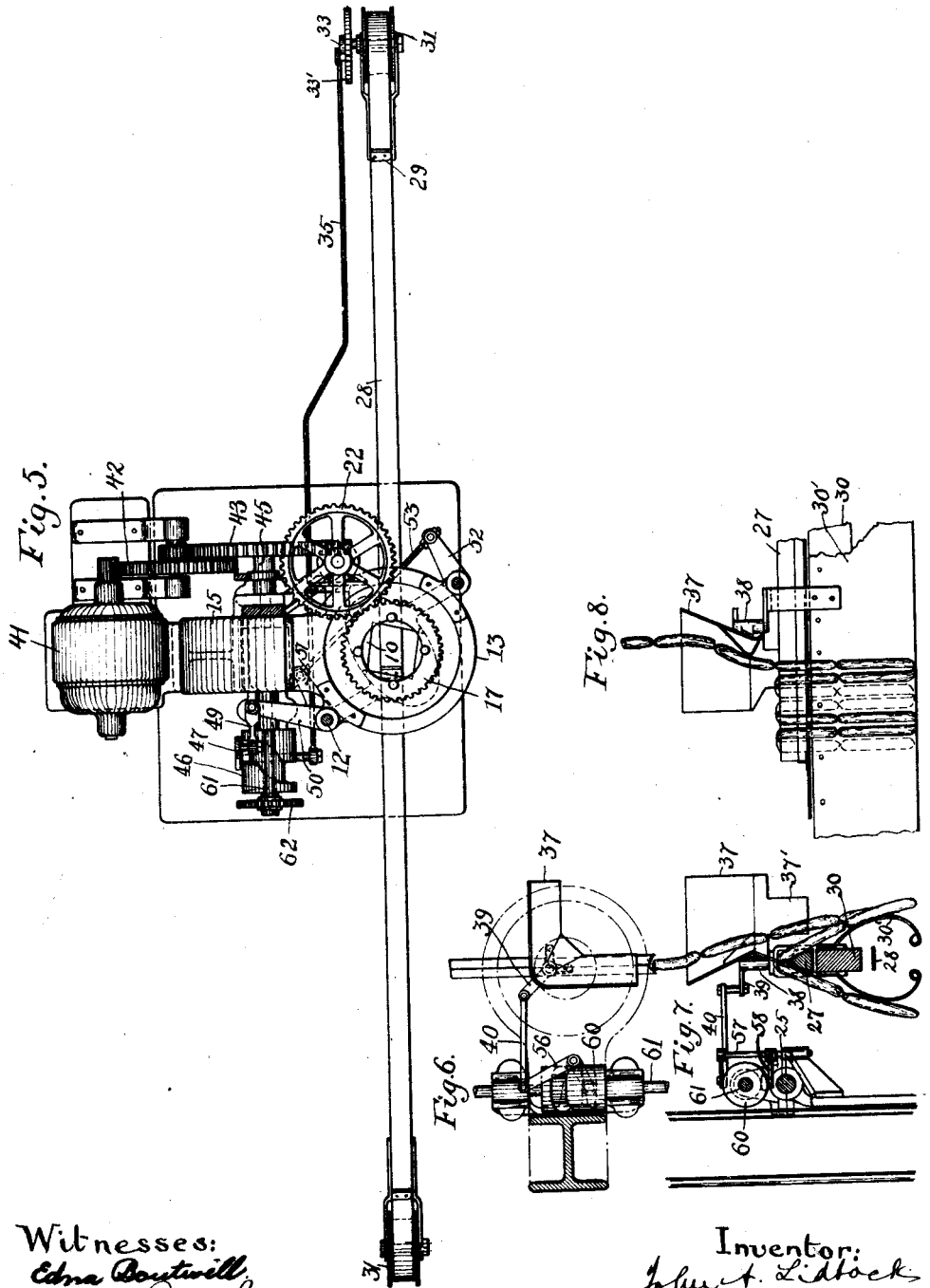
Witnesses:
Edna Boutwell
C. B. Creighton
Inventor:
John A. Lidback
by J. W. Bates
Atty.

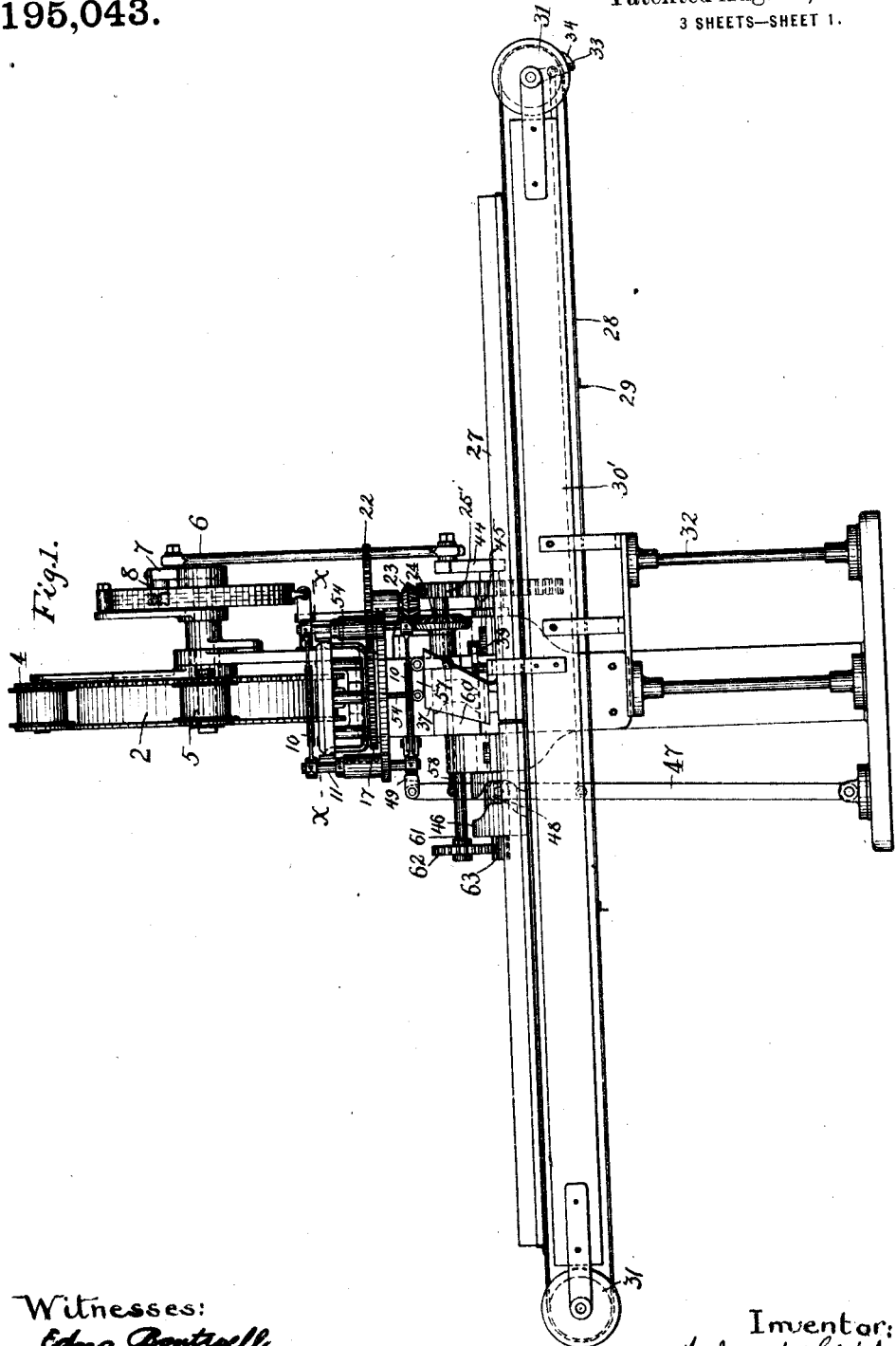

UNITED STATES PATENT OFFICE.

JOHN A. LIDBACK, OF PORTLAND, MAINE, ASSIGNOR, BY MESNE ASSIGNMENTS, OF ONE-EIGHTH TO GEORGE H. LIDBACK, INDIVIDUALLY; GEORGE H. LIDBACK, OF PORTLAND, MAINE, ADMINISTRATOR OF SAID JOHN A. LIDBACK, DECEASED.

SAUSAGE-LINKING MACHINE.

1,195,043. Specification of Letters Patent. Patented Aug. 15, 1916.

Application filed November 3, 1913. Serial No. 798,794.

*To all whom it may concern:*

Be it known that I, JOHN A. LIDBACK, of Portland, in the county of Cumberland and State of Maine, have invented certain new and useful Improvements in Sausage-Linking Machines, of which the following is a specification.

My invention relates to machines for linking and sticking sausages.

The sausages after they come from the stuffing machine are divided into links by contracted joints or divisions, this work being commonly done by hand. To do the work by means of an automatic machine is difficult on account of the fragile nature of the casing or membrane in which the meat is inclosed and on account of the rapidity of operation necessary to take the place of hand work economically.

The object of my invention is to produce a sausage linking machine which will handle the sausages rapidly and tenderly so that the casings will not be broken and which will subsequently loop them over smoke house sticks ready to be hung in the smoke house. This is accomplished by means of the mechanism hereinafter described and claimed.

My invention may best be understood by reference to the accompanying drawing in which is shown a sausage linking and sticking machine constructed according to my invention.

In the drawing, Figure 1 is a general front elevation of the machine, Fig. 2 is a side elevation, Fig. 3 is a plan of the twisting mechanism below the line of *x x* of Fig. 1, Fig. 4 is a vertical section on the line *x x* of Fig. 3, Fig. 5 is a plan taken below the line *x x* of Fig. 2, Fig. 6 is a detail plan of the looping mechanism for loading the smoke house sticks, Fig. 7 is a detail elevation of the same, and Fig. 8 is a front elevation of the same.

The stuffed casings are fed to the machine through an inclined spout 1 supported by brackets adjacent to the upper portion of the grooved feeding wheel 2 to the top of which the casing is delivered. As said wheel turns, the stuffed casing descends, being held in the groove of the wheel by an endless band 3 running over guide pulleys 4 and 5 both of which are journaled on the ends of arms which project out from the frame of the machine. The tension on the belt 3 is just enough to hold the stuffed casing firmly in place in the groove without breaking the membrane.

Motion is imparted to the pulley 5 by a gear on the feed wheel 2 which engages a pinion on the pulley 5. An intermittent motion is given to the feed wheel by pitman 6 which is pivoted to an arm 7, the latter being loosely journaled on the shaft 9 on which the wheel 2 is journaled. A pawl 8 on the end of the arm 7 acts on the edge of the feed wheel 2 to intermittently turn said wheel and so feed the stuffed casing.

The stuffed casing as it leaves the feed wheel hangs vertically downward and passes through the twisting mechanism. The sausage is twisted by being seized intermittently by two pairs of grippers one above the other and spaced apart the length of a single sausage. These grippers form the contracted joints which separate the sausage into links. The links are twisted while held by the grippers through the action of a set of holders pivoted to a twisting ring and which seize the body of the sausage and rotate it.

As herein shown, each set of grippers is composed of two oppositely disposed plates 10 secured to vertical shafts 11 and 12. These plates 10 have opposing angular recesses and are so arranged that when they close or overlap they will form a contracted joint in the casing. The two sets of grippers are secured on the opposite ends of the vertical shafts 11 and 12 and they are spaced apart a distance equal to the length of a single sausage. The shafts 11 and 12 are journaled in a bracket 13 which extends outward from the frame 15 of the machine. The bracket has a central opening 16 which is in the path of the sausage and the latter passes down through the opening.

The sausage twisting mechanism is located between the two sets of grippers and consists of a rotating ring carrying a set of holding arms disposed in the ring and around the sausage in position to seize it when the ring rotates. The twisting mechanism is supported as shown by the bracket 13. As here shown, the twisting mechanism consists of a rotatable twisting ring 17 to which is pivoted a series of holding arms 18 shown as four in number evenly spaced around the ring 17. Each of the holding arms includes a hub from which projects on one side the holding arm proper and on the opposite side a weighted projection 19 to the upper end of which is pivoted the conical roller 20.

The holding arms are arranged in pairs the two opposite arms constituting a pair. The arms of each pair are on the same level but the arms of one pair are above the arms of the other pair. The two arms of each pair swing toward and from each other and embrace a portion of the sausage. The sausage is thus embraced at two different points by the several arms 18 which are formed relatively wide and slightly concave on the inner side. The weighted projections 19 are so located that as they are thrown outwardly by the centrifugal force they will force the arms into the closed position with a gentle holding grip on the sausage. (See dotted lines Fig. 3.)

The twisting ring 17 rests on a supporting ring 21 which contains an annular ball race. Antifriction balls are interposed between the twisting ring 17 and the supporting ring 21 to provide for the easy rotation of the twisting ring.

The twisting ring 17 is continuously rotated by a horizontally disposed gear 22 which engages gear teeth on the periphery of the twisting ring 17. The gear 22 is on the upper end of a vertical shaft on the lower end of which is the bevel gear 23 engaging a bevel gear 24 on the counter shaft 25. (Fig. 2.) The counter shaft 25 takes its power from the gear 43 on the main shaft 23 by means of a pinion 25′ which engages the gear 43.

As pointed out, the holding arms are closed by centrifugal action but they are opened by positive mechanism.

As here shown the projections 19 are forced simultaneously inward by means of a vertically movable ring 26 which has a conical inner surface engaging the conical surfaces on the rolls 20. The depression of the ring 26 thus tends to force the conical rolls and the projections 19 inward toward the center and to open the arms 18. The lifting of the ring 26 leaves the arms free to swing inwardly by the outward throw of the projections 19.

Means are provided for looping the linked sausages over the smoke house sticks so that they may be carried bodily into the smoke house. The sticks are fed directly beneath the line of vertically suspended linked sausages and as the sausages descend after being linked they are looped back and forth over the stick by reciprocating mechanism which throws them first on one side of the stick and then on the other.

As here shown, the smoke house sticks 27 are supported on an endless belt or carrier 28 having a series of stops 29 against which the ends of the sticks impinge and by which they are fed along. The belt extends in opposite directions from the line of delivery of the sausages and it is long enough to hold several of the sticks at least one on each side of the line of delivery of the sausages.

The belt 28 runs over two guide pulleys 31 journaled at opposite ends of a beam 30 supported on standards 32. The pulley 31 is intermittently rotated to feed the belt 28 by an arm 33 pivoted on the pulley shaft and having on its end a pawl 34 which engages the ratchet wheel 33′ secured on the same shaft as the pulley. The arm 33 is oscillated by means of a pitman 35 which is connected with an upright oscillating lever 47. (See Fig. 5.) The beam 30 has on each side a guide or spreader 30′ which spread the sausage loops.

As here shown, the linked sausages are looped from side to side over the smoke house stick by means of an oscillating guide 37 which is located beneath the linking mechanism and above the smoke house stick. It has two upwardly flaring abutments set preferably at right angles to each other and downwardly extending projections 37′ positioned to press the sausages against the beam and hold them there while the loops are forming. The guide is secured to an arm extending out from a hub 38, said hub being pivoted directly over the belt 28 to a bracket secured to the beam 30. An arm 39 connected with the hub is pivoted to a pitman 40 by which the guide is oscillated from side to side directing the line of linked sausages so that it falls first on one side and then on the other.

Power is applied to the machine by any suitable means as for instance by an electric motor 41 from which power is transmitted through a train of gears 42 to the gear 43 on the main shaft 45. A crank arm 44 on the main shaft actuates the pitman 6 already described through which an intermittent motion is applied to the feed wheel 2. The main shaft extends through to the opposite side of the machine where it is provided with a grooved cam 46 (Fig. 1) through which most of the motions of the linking and sticking mechanism are effected.

An upright lever 47 pivoted at its lower end is provided with a cam roll 48 which runs in the groove of the cam 46 and oscillates the lever in a vertical plane (Fig. 3).

A pitman 49 connects the lever 47 with the end of an arm 50 secured to the upright shaft 11. A second arm 51 on the upright shaft 11 connects with a like arm 52 on the upright shaft 12 by means of a pitman 53. (See Fig. 3.) The reciprocation of the lever 47 thus oscillates the two upright shafts 11 and 12 and they in turn open and close the grippers 10 whereby the contracted joints are formed which separate the sausage into links.

The holding arms are actuated by the vertical motion of the ring 26. As here shown, the ring is pivotally supported on the ends of a pair of horizontal arms 55 which are in turn pivoted to brackets 56 (Fig. 2). The ring is raised and lowered by a vertical arm 54 which is bifurcated at its upper end, the two upper ends being pivoted to the arms 55. The lower end is connected with the horizontal end of a bell crank lever 57 (Fig. 1) the vertical end of which is connected with a pitman 58 pivoted to the lever 47. Thus the movement of the lever 47 simultaneously opens and closes the grippers and the holding arms.

As already stated, the oscillating sausage guide 37 is actuated through a pitman 10 (Figs. 6 and 7) which connects with an arm 56 on the upper end of a vertical shaft 57. On the lower end of this shaft is a second arm 58 on the end of which is a cam roll fitting in the groove of a path cam 60 on the counter shaft 61. The shaft 61 takes its motion from the main shaft 45 by means of a gear 62 which engages a pinion 63 (see Fig. 1) on the main shaft 45.

In operation, the stuffed casings are fed over the feed wheel and pass vertically down through the grippers and holding arms where the casing is intermittently seized by the grippers to form the joints, the body of the sausage being twisted while the same is held by the grippers. Each time the grippers are released the sausage is fed the length of two links every alternate link remaining untwisted. As the sausages drop through the linking mechanism they are looped on the smoke house sticks as described. It will be noted that the endless belt with its smoke house sticks extends a considerable distance each side of the line of delivery of the linked sausages so that the sticking operation goes on continuously while the machine is running. The smoke house sticks are placed end to end so that when one is filled the loop of sausages will be laid over the next adjoining stick, the first stick removed and so on indefinitely.

The sausage linking machine herein described is capable of doing rapid work without injury to the sausages, it is more sanitary than hand work and enables the sausages to be produced at a lower cost.

I claim:—

1. In a machine for linking sausages, the combination of a feeding device for feeding the stuffed casing, two sets of grippers for forming contracted joints in the casing, said grippers being spaced apart the length of one sausage, a twisting ring through which the sausages pass, pivoted holding arms carried by said ring and spaced far enough from said grippers to embrace the uncontracted body of the sausage and means for rotating said ring.

2. In a machine for linking sausages, the combination of a feeding device for feeding the stuffed casings, two sets of grippers for forming contracted joints in the casing, said grippers being spaced apart the length of one sausage, a twisting ring between said sets of grippers through which the sausages pass, pivoted holding arms carried by said ring and spaced far enough from said grippers to embrace the uncontracted body of the sausage, means for rotating said twisting ring and means for opening and closing said arms.

3. In a machine for linking sausages, the combination of a feeding device for feeding the stuffed casings, two sets of grippers for forming contracted joints in the casing, said grippers being spaced apart the length of one sausage, a twisting ring between said sets of grippers through which the sausages pass, pivoted holding arms carried by said ring and spaced far enough from said grippers to embrace the uncontracted body of the sausage, means for rotating said twisting ring and means for opening and closing said arms while the twisting ring is in motion.

4. In a machine for linking sausages, the combination of a feeding device for feeding the stuffed casings, two sets of grippers for forming contracted joints in the casing, said grippers being spaced apart the length of one sausage, a twisting ring between said sets of grippers through which the sausages pass, pivoted holding arms carried by said ring and spaced far enough from said grippers to embrace the uncontracted body of the sausage, said holding arms being formed to close by centrifugal force when the twisting ring is in motion, means for rotating said twisting ring and means for positively opening said holding arms while the twisting ring is in motion.

5. In a machine for linking sausages, the combination of a feeding device for feeding the stuffed casing, two sets of grippers for forming contracted joints in said casing, said grippers being spaced apart the length of one sausage, a twisting ring between said sets of grippers through which the sausages pass, pivoted holding arms carried by said ring for embracing the body of the sausage, said arms having weighted projections positioned to be thrown outwardly to close the arms by centrifugal force and means for positively forcing said projections inwardly to open the arms.

6. In a machine for linking sausages, the combination of a feeding device for feeding the stuffed casing, two sets of grippers for forming contracted joints in said casing, said grippers being spaced apart the length of one sausage, a twisting ring between said sets of grippers through which the sausages pass, pivoted holding arms carried by said ring for embracing the body of the sausage, said arms having weighted projections positioned to be thrown outwardly to close the arms by centrifugal force and a vertically movable opening ring for forcing said projections inwardly to open the arms.

7. In a machine for linking sausages, the combination of a feeding device for feeding the stuffed casing, two sets of grippers for forming contracted joints in said casing, said grippers being spaced apart the length of one sausage, a twisting ring between said sets of grippers through which the sausages pass, pivoted holding arms carried by said ring for embracing the body of the sausage, said arms having weighted projections positioned to be thrown outwardly to close the arms by centrifugal force, an opening ring for forcing said projections inwardly to open said arms, a pair of levers to the ends of which said ring is pivoted and means for reciprocating said levers vertically.

8. In a machine for linking sausages, the combination of a feeding device for feeding the stuffed casing, two sets of grippers for forming contracted joints in said casing, said grippers being spaced apart the length of one sausage, a twisting ring between said sets of grippers through which the sausages pass, pivoted holding arms carried by said ring for embracing the body of the sausage, said arms having weighted projections positioned to be thrown outwardly to close the arms by centrifugal force, conical rolls pivoted on said projections and a vertically movable opening ring having a conical inner surface positioned to engage said conical rolls to force the same inwardly.

9. In a machine for linking sausages, the combination of a feeding device for feeding the stuffed casing, two sets of grippers for forming contracted joints in said casing, said grippers being spaced apart the length of one sausage, a twisting ring between said sets of grippers through which the casing passes, said ring being provided with external gear teeth, a ring driving gear engaging said twisting ring, pivoted holding arms carried by said ring for embracing the body of the sausage, said arms having weighted projections positioned to be thrown outwardly to close the arms by centrifugal force and means for positively forcing said projections inwardly to open the arms.

10. In a sausage linking machine, the combination of means for linking and delivering a line of vertically suspended linked sausages, an endless belt for supporting a smoke house stick in the line of delivery of the sausages, means for feeding said belt and an oscillating guide having lateral abutments between which the line of sausages passes above the smoke house stick whereby the sausages are positively thrown from side to side over said smoke house sticks.

11. In a sausage linking machine, the combination of means for linking and delivering a line of vertically suspended linked sausages, an endless belt for supporting a smoke house stick in the line of delivery of the sausages, means for feeding said belt and an oscillating guide having lateral abutments between which the line of sausages passes above the smoke house stick whereby the sausages are positively thrown from side to side over said smoke house sticks, said abutments having downward extensions which impinge against the sausages and hold them against the stick immediately after the loop is formed.

12. In a sausage linking machine, the combination of means for linking and delivering a line of vertically suspended linked sausages, an endless belt for supporting a smoke house stick in the line of delivery of the sausages, means for feeding said belt and a pivoted oscillating guide having lateral abutments between which the line of sausages passes above the smoke house stick, whereby the sausages are positively thrown from side to side over said smoke house stick.

13. In a sausage linking machine, the combination of means for linking and delivering a line of vertically suspended linked sausages, an endless belt for supporting a smoke house stick in the line of delivery of the sausages and extending far enough in each direction from said line of delivery to support a smoke house stick, an oscillating guide for guiding the line of sausages first on one side of said stick and then on the other to form loops and means for feeding said belt.

14. In a sausage linking machine, the combination of means for linking and delivering a line of vertically suspended linked sausages, an endless belt for supporting a smoke house stick in the line of delivery of the sausages and extending far enough in each direction from said line of delivery to support a smoke house stick, means for oscillating said line of sausages to loop the same over said stick from side to side and means for feeding said belt.

15. In a sausage linking machine, the combination of means for linking and delivering a line of vertically suspended linked sausages, an endless belt for supporting a smoke house stick in the line of delivery of the sausages and extending far enough in each direction from said line of delivery to support a smoke house stick, stops on said belt against which the ends of the smoke house sticks impinge, means including lateral abutments for positively oscillating said line of sausages to loop the same over said stick from side to side and means for feeding said belt.

16. In a linking machine, the combination of means for linking and delivering a line of vertically suspended linked sausages, an endless belt for supporting a smoke house stick in the line of delivery of the sausages, means for feeding said belt and means including lateral abutments for positively oscillating the line of sausages from side to side to form a series of loops over said stick.

17. In a machine of the character described, the combination of a sausage twisting mechanism, a longitudinally movable link holder for receiving the linked sausage and a laterally reciprocating guide having abutments between which the line of linked sausages pass and by which they are looped from side to side on the loop holder.

In testimony whereof I have affixed my signature, in presence of two witnesses.

JOHN A. LIDBACK.

Witnesses:
S. W. BATES,
CORA B. CREIGHTON.